US009151648B2

(12) United States Patent
Strom et al.

(10) Patent No.: US 9,151,648 B2
(45) Date of Patent: *Oct. 6, 2015

(54) PROCESS VARIABLE MEASUREMENT USING PRIMARY ELEMENT CONNECTION PLATFORM

(71) Applicant: Dieterich Standard, Inc., Boulder, CO (US)

(72) Inventors: Gregory Robert Strom, Boulder, CO (US); Paul Timothy Deegan, Denver, CO (US)

(73) Assignee: Dieterich Standard, Inc., Boulder, CO (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/836,263

(22) Filed: Mar. 15, 2013

(65) Prior Publication Data
US 2014/0260670 A1    Sep. 18, 2014

(51) Int. Cl.
G01F 1/34        (2006.01)
G01F 1/42        (2006.01)
G01F 15/06       (2006.01)
G01F 15/14       (2006.01)
(Continued)

(52) U.S. Cl.
CPC .. G01F 1/34 (2013.01); G01F 1/42 (2013.01); G01F 15/063 (2013.01); G01F 15/14 (2013.01); G01F 15/18 (2013.01); G01F 1/32 (2013.01); G01F 1/44 (2013.01); G01F 1/58 (2013.01); G01F 1/66 (2013.01); G01F 1/8468 (2013.01)

(58) Field of Classification Search
CPC ..................................... G01F 1/34; G01F 1/42

USPC ................ 73/861.42, 861.61, 861.01, 861.05
See application file for complete search history.

(56) References Cited

U.S. PATENT DOCUMENTS 2,050,544 A    8/1936  Robinson et al.
2,585,290 A    2/1952  Walker
(Continued)

FOREIGN PATENT DOCUMENTS

DE    10 2007 034 158    1/2009
JP          59054864        3/1984
(Continued)

OTHER PUBLICATIONS

U.S. Appl. No. 14/139,916 Gregory Storm Dec. 24, 2013.*
(Continued)

Primary Examiner — Jewel V Thompson
(74) Attorney, Agent, or Firm — Westman, Champlin & Koehler, P.A.

(57) ABSTRACT

An apparatus for measuring a process variable of a process fluid based upon a process variable sensor measurement, includes an elongate spool that provides a spool conduit therethrough adapted to be coupled in line with process piping to receive a flow of process fluid. A meter body is carried in the elongate spool and receives the spool conduit therethrough. The meter body has a primary element opening which extends from the spool conduit to outside of the meter body. A carrier is configured to removably mount to the meter body and includes a primary element in the spool conduit through the primary element opening. A process variable transmitter is coupled to the primary element and is configured to measure the process variable of process fluid. The meter body is preferably configured to receive different types of primary elements carried on the carrier.

25 Claims, 7 Drawing Sheets

(51) Int. Cl.
*G01F 15/18* (2006.01)
*G01F 1/32* (2006.01)
*G01F 1/44* (2006.01)
*G01F 1/58* (2006.01)
*G01F 1/66* (2006.01)
*G01F 1/84* (2006.01)

(56) References Cited

U.S. PATENT DOCUMENTS

| | | |
|---|---|---|
| 3,822,592 A | 7/1974 | Siegel et al. |
| 4,370,893 A | 2/1983 | Combes |
| 4,422,339 A | 12/1983 | Gall et al. |
| 4,503,594 A | 3/1985 | Gall et al. |
| 4,989,456 A | 2/1991 | Stupecky |
| 5,069,252 A | 12/1991 | Kendrick et al. |
| 5,186,474 A | 2/1993 | Jacobs |
| 5,305,796 A | 4/1994 | Klak |
| 5,463,904 A | 11/1995 | Kalinoski |
| 5,617,899 A | 4/1997 | Linton et al. |
| 5,655,571 A | 8/1997 | Gawlik |
| 5,836,356 A | 11/1998 | Desai |
| 6,543,297 B1 | 4/2003 | Kleven |
| 8,215,340 B2 | 7/2012 | Loga et al. |
| 2011/0079090 A1 | 4/2011 | Kroemer et al. |

FOREIGN PATENT DOCUMENTS

| | | |
|---|---|---|
| WO | WO 02/063250 | 8/2002 |
| WO | WO 2009108500 A2 | 9/2009 |

OTHER PUBLICATIONS

International Search Report in International Application No. PCT/US2009/033767, filed Feb. 11, 2009, and Written Opinion dated Aug. 31, 2009 in PCT/US2009/033767, filed Feb. 11, 2009, 6 pgs.
Daniel Orifice Fittings Brochure, Emerson Process Management, 9 pgs.
Notification of Transmittal of the International Search Report and the Written Opinion of the International Searching Authority, or the Declaration, from PCT/US2014/021600, dated Jul. 14, 2014.
Notification of Transmittal of the International Search Report and the Written Opinion of the International Searching Authority, or the Declaration, from PCT/US2014/021597, dated Jul. 14, 2014.

* cited by examiner

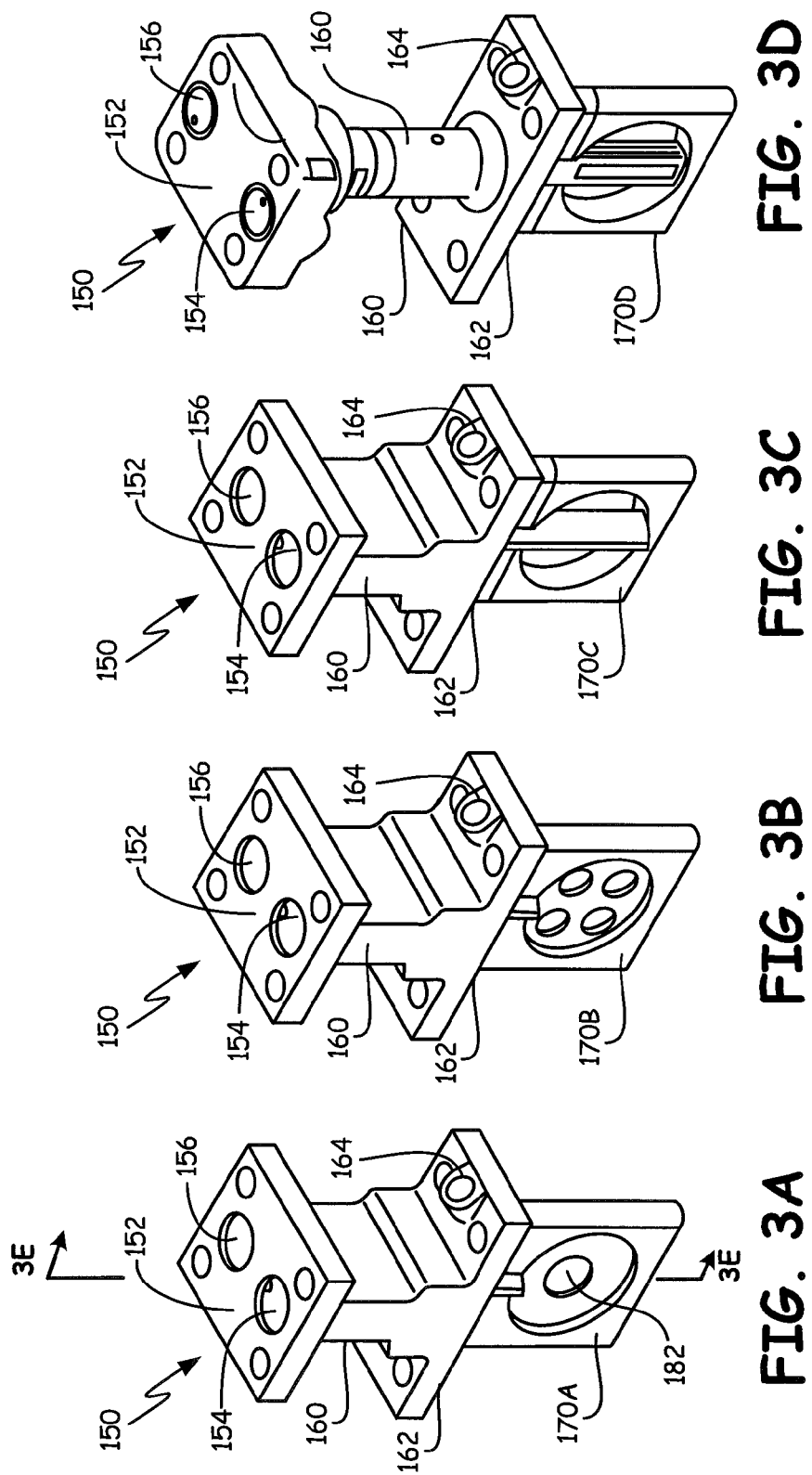

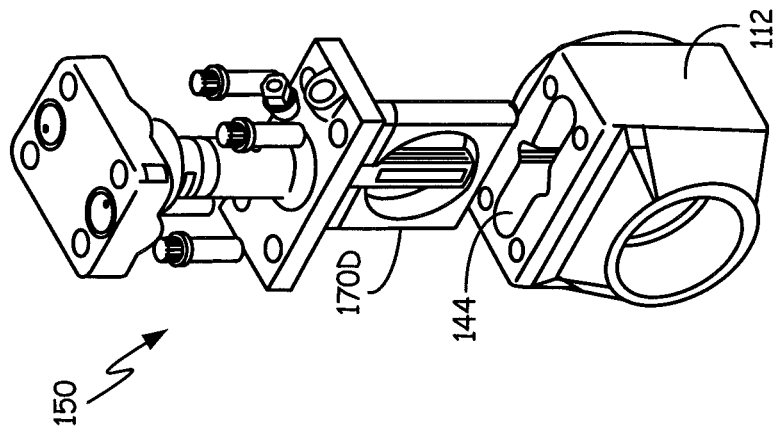
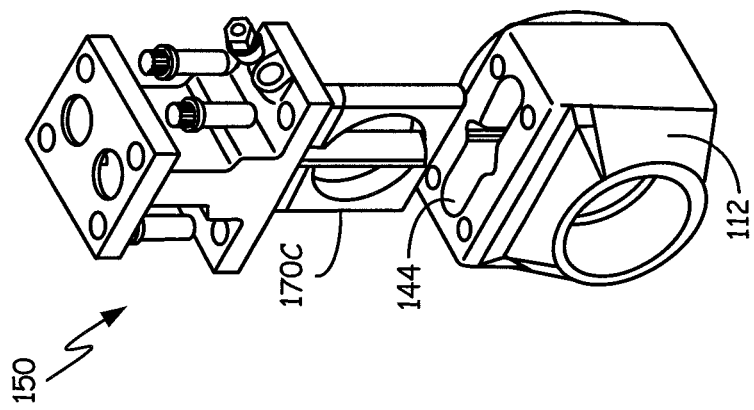
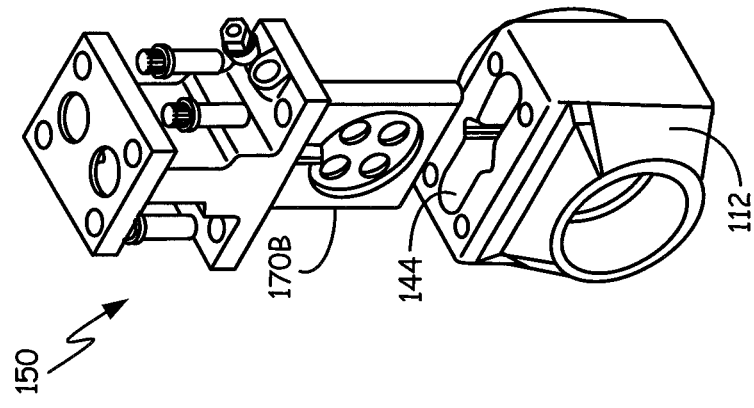
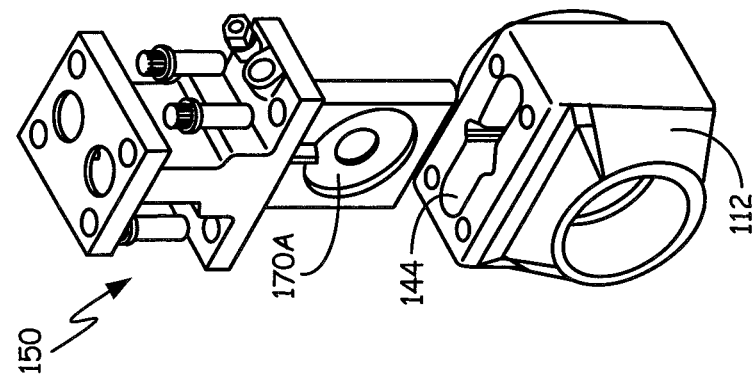

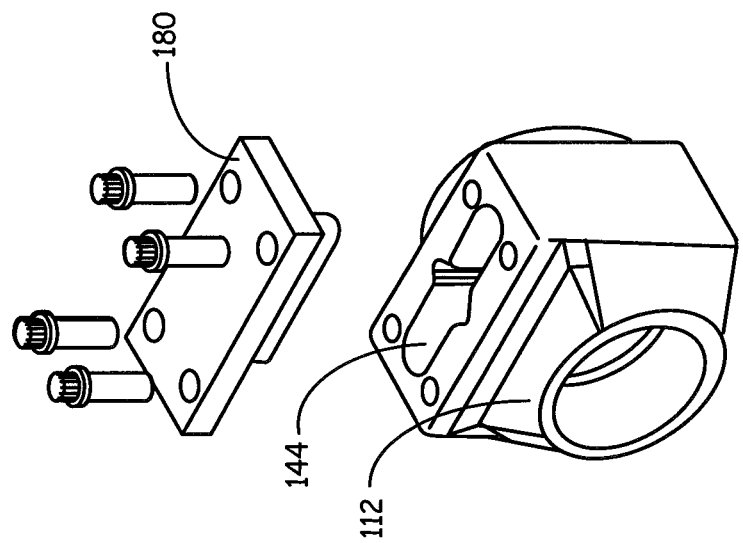

PROCESS VARIABLE MEASUREMENT USING PRIMARY ELEMENT CONNECTION PLATFORM

BACKGROUND

The present invention relates to measurement of a process variable in an industrial process. More specifically, the present invention relates to measurement of such a process variable using a primary element placed in the flow.

Industrial processes are used in the production of many types of process fluids. Examples include oil refineries, paper pulp manufacturing, chemical manufacturing, etc. In an industrial process, it is necessary to monitor operation of the process in order to accurately control the process. For example, "process variables" such as flow rate, temperature, pressure, level, etc. of the process can be monitored by process variable transmitters and used to provide the information to another location such as a central control room. In many instances, there are a number of different technologies or configurations of a process variable transmitter which can be used to measure a process variable. The particular technology and configuration can be selected based upon design constraints, desired accuracy, budgetary concerns, or other criteria.

Various technologies are known for measuring flow of a process fluid in an industrial process. Examples include differential pressure, magnetic, coriolis, vortex, and thermal mass based flow sensors. One general technology includes the use of a circuitry to measure a differential pressure and responsively estimate flow based upon the differential pressure. For example, a restriction can be placed in a pipe which carries a flow of process fluid. As the process fluid moves past the restriction, a differential pressure will be developed on either side of the restriction. This differential pressure can be measured and correlated with flow rate of the process fluid.

The particular installation of a flow measurement system typically requires a great deal of customization based upon the selected technology, the configuration of the process, the fluid being monitored, the diameter of the piping, the expected flow rates, as well other considerations. This customization is expensive and increases the amount of time required to install a process variable transmitter and ensure that it is providing accurate measurements. Further, the customization is often performed while the plant which implements the process is being constructed. For example, during manufacture of a plant, it may be known that a particular process variable measurement must be obtained at a particular location, however, it may not be readily apparent what technology should be used to obtain the process variable, or even if measurement of the process variable is necessary. This can introduce delays in the construction of a new facility as well as increase costs.

SUMMARY

An apparatus for measuring a process variable of a process fluid based upon a process variable sensor measurement, includes an elongate spool that provides a spool conduit therethrough adapted to be coupled in line with process piping to receive a flow of process fluid. A meter body is carried in the elongate spool and receives the spool conduit therethrough. The meter body has a primary element opening which extends from the spool conduit to outside of the meter body. A carrier is configured to removably mount to the meter body and includes a primary element in the spool conduit through the primary element opening. A process variable transmitter is coupled to the primary element and is configured to measure the process variable of process fluid. The meter body is preferably configured to receive different types of primary elements carried on the carrier.

BRIEF DESCRIPTION OF THE DRAWINGS

FIGS. 3A, 3B, 3C, and 3D are perspective views of a primary element carrier and illustrate example primary element configurations.

FIGS. 4A, 4B, 4C, and 4D show the primary elements of FIGS. 3A-D, respectively, proximate a meter body.

FIGS. 5A and 5B are perspective views of a sealing plate and meter body.

DETAILED DESCRIPTION OF ILLUSTRATIVE EMBODIMENTS

Figure 1:
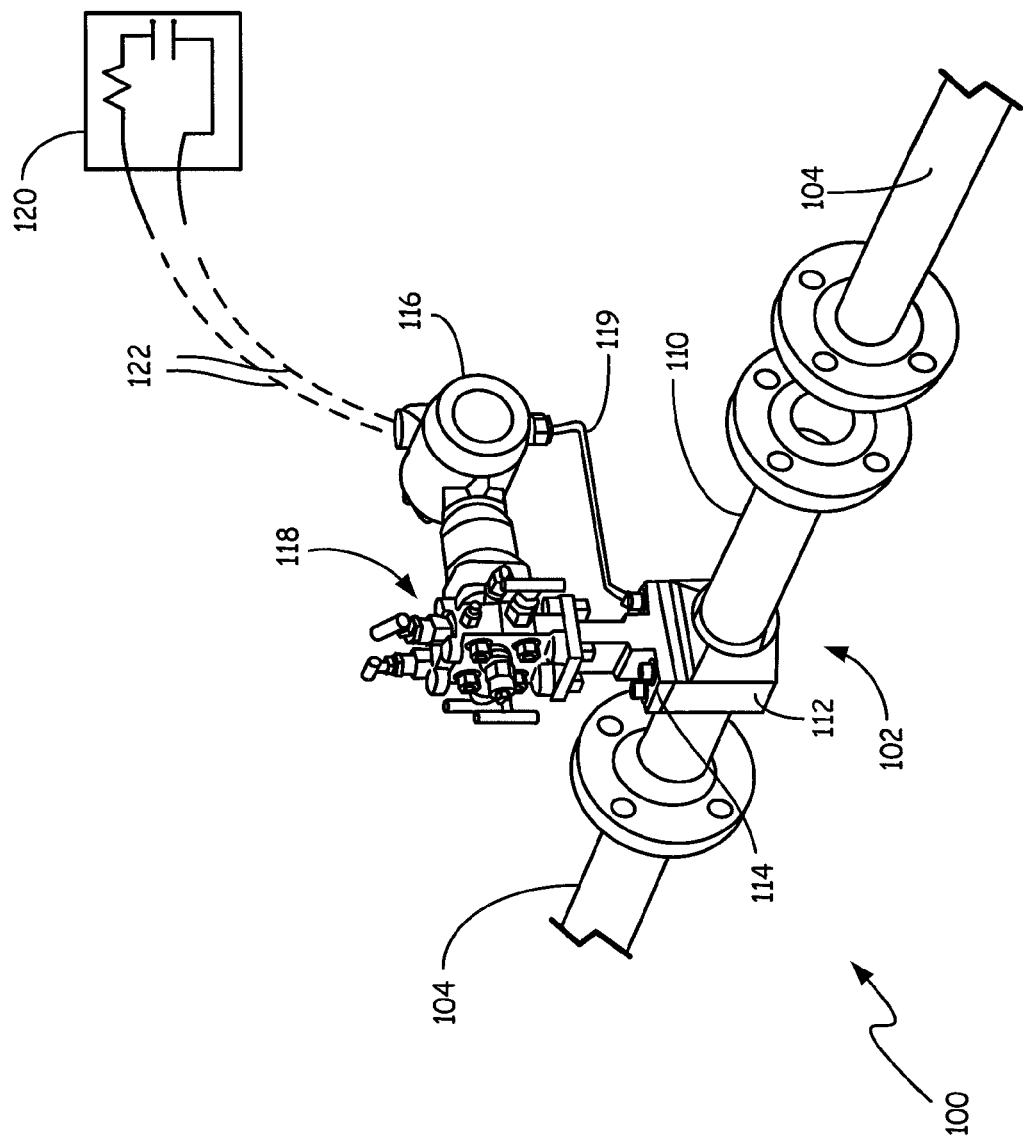
FIG. 1 is a diagram showing an apparatus for measuring flow a process fluid based upon a differential pressure in accordance with one embodiment of the present invention.

As discussed in the Background section, various technologies are known for measuring process variables such as flow in an industrious process. During construction of a plant, it may be apparent that measurement of a process variable at a certain location within the process may be desirable. However, at such an early stage of development, it may not be clear exactly what technology would be preferred. Further still, once a technology is selected, it must be properly installed and calibrated or configured based upon the process environment. This customization increases the time required to construct a new plant, increases overall costs as well increases front end costs. The present invention provides a new process variable measurement platform, along with a new distribution and installation method in which a standardized (or universal) platform may installed at a location in a process which is capable of supporting different types of process variable measurement technologies, including, specifically, different types of flow measurement techniques. The installation platform can be configured to operate without any process variable measurement technology if desired. This allows the optional updating of a process variable transmitter, including the addition of a process variable transmitter at a location in which one was not previously present as well as changing a process variable technology from one measurement technology to another. This platform reduces the amount of customization which must be performed during the initial construction of a plant and allows greater flexibility to change technologies.

One specific process variable measurement technology used for measuring flow is based upon differential pressure which can be used to determine flow rate of a process fluid through process piping. In comparison to other technologies, differential pressure based flow measurements provide a number of advantages including accuracy, lack of moving parts, a robust design which can be used at high temperatures and pressures, low cost components, capability of measuring flow rates of all types of process fluids including gases, liquids, and steams, measurements which can be easily verified and a capability of determining mass flow for gas and steam applications, as well as others. Further, a differential pressure can be generated using a number of different technologies which can be selected for a particular application. The differential pressure generating element is referred to as a "primary element." Despite the above advantages, one disadvantage of differential pressure based flow measurements is that the systems may require a great deal of customization for a given application. For example, the application may need to be customized based upon the diameter of the pipe being used, the wall thickness of the pipe, the temperature of the process fluid, expected temperature ranges, and pressure ranges, expected flow ranges, properties of the process fluid being measured, among others. All of these variables must be determined for each location within the industrial process at which a differential pressure based flow measurement is to be taken. This can be time consuming and further requires customization of each of the flow measurement devices within the industrial process. Further, in order to obtain accurate flow measurements using differential pressure, the flow profile of the process fluid should be fully developed. However, the configuration of the adjacent piping (such as elbows, tees, valves, constrictions, expansions, filters, etc.) can disturb the flow profile thereby resulting in a measurement error.

The present invention provides a universal connection platform for measurement of flow rate of a process fluid using differential pressure. However, the present invention is not limited to differential pressure based flow measurement techniques. With the present invention, a platform is provided which uses standardized components that can be selected for a particular application and differential pressure measurement technology. With the present invention, a meter body is carried in an elongate spool. The meter body is configured to receive a primary element which is supported and secured by a carrier. A differential pressure transmitter couples to the carrier and measures the differential pressure generated on either side of the primary element. This information is then used to determine flow rate.

FIG. 1 is a diagram showing a portion of an industrial process 100 including a flow measuring apparatus 102 in accordance with one embodiment of the present invention. Flow measuring apparatus 102 couples to process piping 104 and is configured to measure flow of a process fluid through piping 104 as discussed below in more detail. Flow measuring apparatus 102 includes a spool section 110 which carries a meter body 112. A carrier 114 couples to the meter body 112 and supports a primary element (not shown in FIG. 1) and a differential pressure transmitter 116. The process variable transmitter 116 couples to the carrier 114 through a manifold connection 118. Typically, transmitter 116 is attached to the flange 118 through bolts or other means to secure the two together. Similarly, flange 118 can be bolted to carrier 114, which in turn is bolted to meter body 112. Spool section 110 is attached to piping 104 through, for example, bolts. Typically some type of seal may be included between the transmitter 116, flange 118, carrier 114 and meter body 112. Similarly, seals can be positioned between spool 110 and process piping 104. Although bolts are described herein, any appropriate attachment technique may be employed. The meter body 112 and spool 110 can be formed as a continuous piece, or can be formed separately and welded together or otherwise coupled together. The transmitter in FIG. 1 also includes an additional process variable connection 119 to the carrier 114. For example, this can be used to connect the transmitter 116 to a temperature sensor. The differential pressure transmitter 116 determines flow of the process fluid based upon a differential pressure generated by the primary element. Pressure transmitter 116 couples to, for example, a control room 120 through a two-wire process control loop 122. The control room 120 is modeled as a resistance in series with a power supply. In one configuration, the process control loop 122 is a two-wire process control loop. In such a configuration, the control loop 122 can carry both information as well as power used to power transmitter 116. For example, in accordance with one embodiment, a current carried on the loop is controlled by the pressure transmitter 116 and is representative of the measured flow. The same current is also used to power circuitry within transmitter 116. In another example embodiment, a digital communication signal can be superimposed on this current to provide additional communication. One such protocol is the HART® communication protocol. Example process control loops include 4-20 mA loops, or loops in accordance with the HART®, Profibus or Fieldbus standards. One example of a wireless communication technique is in accordance with the WirelessHART® communication protocol (IEC 62591). Standard Ethernet, fiberoptic connection, or other communication channels may also be used.

Figure 2:
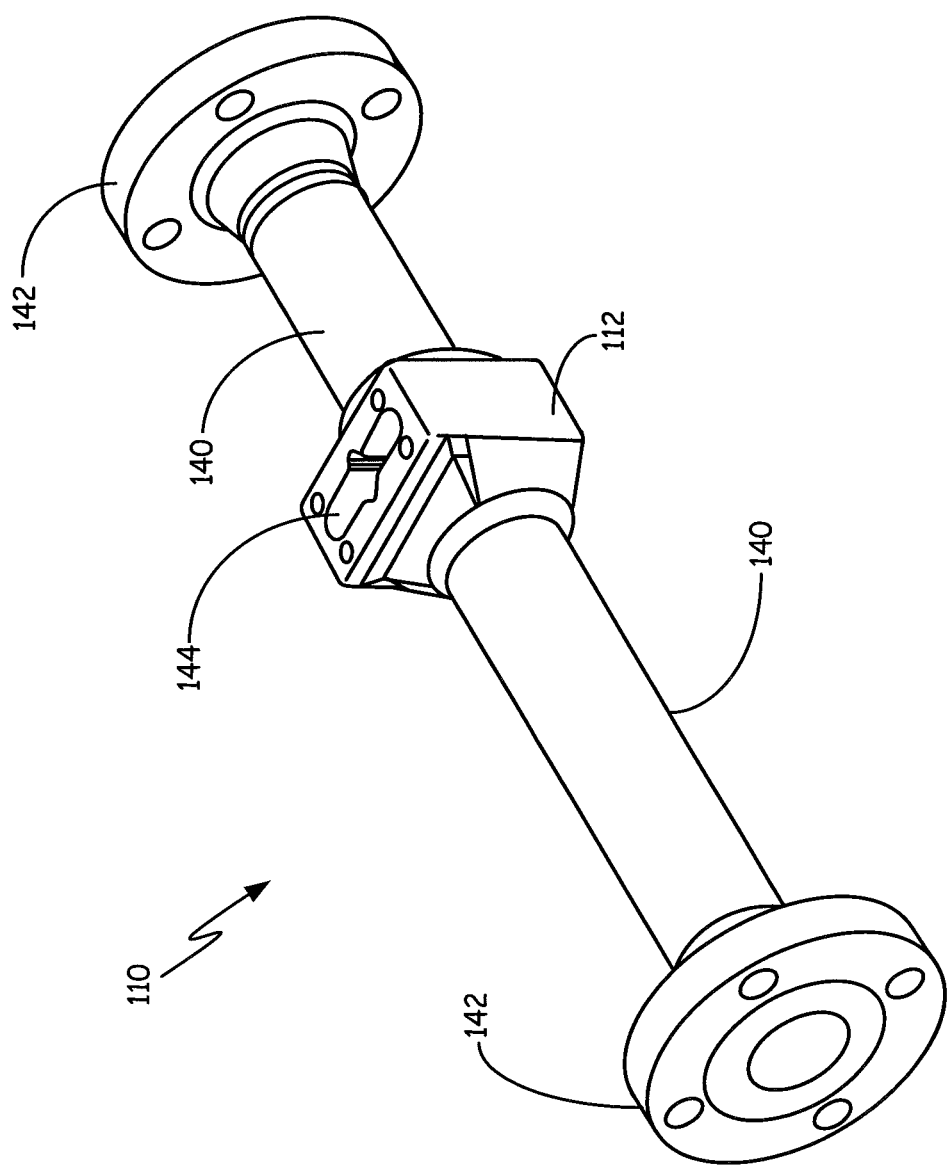
FIG. 2 is a perspective view of a spool section shown in FIG. 1.

FIG. 2 is a perspective view of spool section 110 shown in FIG. 1. Spool section 110 includes an elongate spool conduit 140 which couples to flanges 142. Flanges 142 are used to couple the spool section 110 to process piping whereby spool conduit 140 receives the flow of process fluid therethrough. The spool conduit 140 extends through meter body 112 which includes a primary element opening 144 explained herein in more detail. Primary element opening 144 extends from outside of the meter body 112 to within the spool conduit 140. In the example embodiment illustrated in FIG. 2, the spool conduit 140 is a straight conduit.

FIGS. 3A, 3B, 3C and 3D are perspective views of a primary element carrier 150. The primary element carrier 150 includes a transmitter or manifold mounting face 152 having pressure ports 154 and 156 formed therein. The mounting face is preferably supported on a riser section 160 and couples to a meter body mounting face 162. The meter body mounting face 162 is configured to be sealably coupled to meter body 112 shown in FIG. 1. FIGS. 3A-D show various examples of a primary element 170A-D which is inserted through primary element opening 144 shown in FIG. 2 and configured to receive a flow of process fluid through spool conduit 140 also shown in FIG. 2.

In FIG. 3A, a primary element 170A is illustrated as an orifice plate. The orifice plate 170A is illustrated as a plate having an opening therethrough which has a diameter which is less than the diameter of the spool conduit 140. In FIG. 3B, a primary element 170B is illustrated as a conditioning orifice plate consisting of four smaller openings. FIG. 3C shows an example embodiment of an averaging pitot tube type primary element 170C. The primary element 170C is well-suited for severe environments in which debris may damage components of the device. A pitot tube type primary element consists of an elongate tube which extends into the flow of the process fluid and has an at least one opening proximate an upstream side of the pitot tube and a at least one other opening proximate a downstream side of the pitot tube. The differential pressure is generated between these two openings. FIG. 3D illustrates another example embodiment of an averaging pitot tube type primary element 170D. In FIG. 3D, the pitot tube is configured as an Annubar® averaging pitot tube which is available from Rosemount Inc. Also illustrated in the embodiments shown in FIGS. 3A-D is secondary connection 164 on meter body mounting face 162. Secondary connection 164 can, for example, comprise an opening which extends close to the process fluid allowing additional process variables to collected such as process fluid temperature. As illustrated in FIG. 1, process variable connection 119 can couple to secondary connector 164. Although the orifice plates illustrated in FIGS. 3A-D are shown as a single piece with the primary element carrier 150, in one embodiment these can be two separate pieces whereby a desired orifice plate 170 can be attached to the carrier 150. The attachment can be through known techniques used to mount orifice plates, for example, bolting the plate onto the carrier and including a seal therebetween.

Figure 3E:
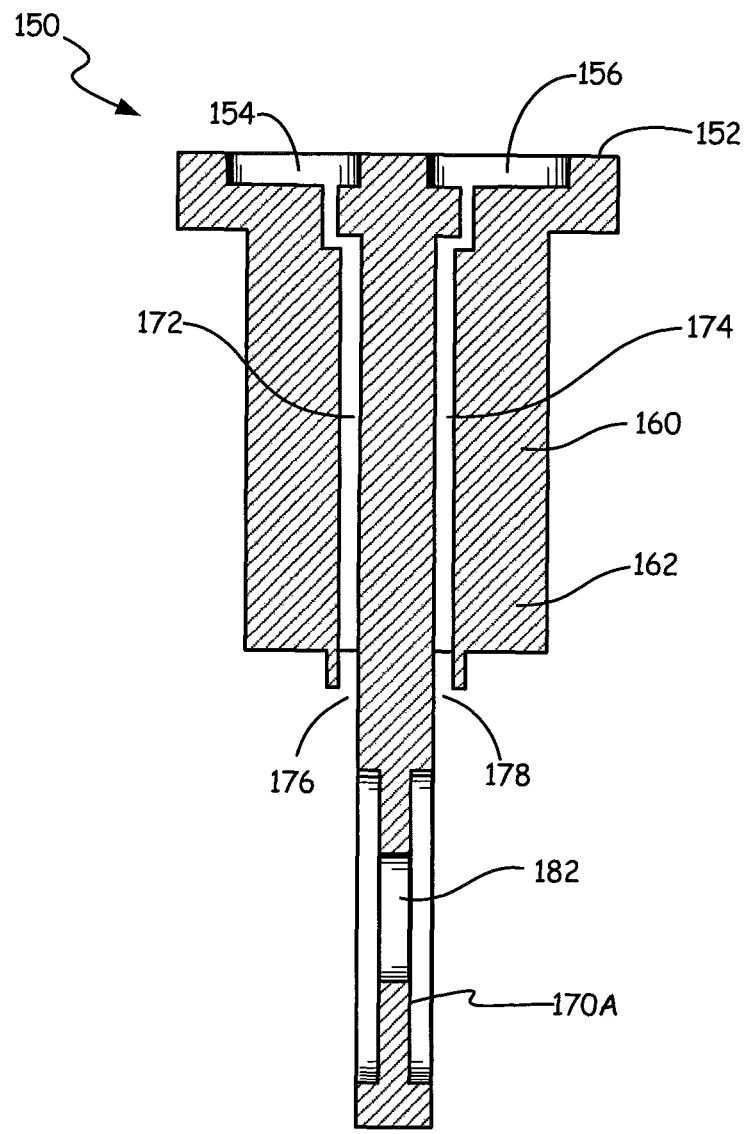
FIG. 3E is a side cross-sectional view of the primary element carrier of FIG. 3A.

FIG. 3E is a cross-sectional view of primary element carrier 150. In this example, a cross-sectional view of FIG. 3A is shown which includes orifice plate primary element 170A. FIG. 3E illustrates internal passageways 172 and 174 which extend from process openings 176, 178 to pressure ports 154, 156, respectively, on mounting face 152. FIG. 3E also illustrates orifice plate opening 182. One of the ports 176, 178 is positioned on an upstream side of primary element 170A and the other port 176, 178 is positioned on a downstream side. Thus, upstream and downstream pressures are coupled via passageways 172, 174 to pressure ports 154, 156. These pressures are then conveyed to transmitter 116 preferably through manifold connection 118 shown in FIG. 1.

FIGS. 4A, 4B, 4C, and 4D are perspective views of primary element carrier 150 positioned adjacent meter body 112. As illustrated in FIGS. 4A-D, the primary elements 170A-D are configured to be received in primary element opening 144. In one configuration, the primary element opening 144 and primary elements 140A-D are arranged so that the two pieces can only be mounted together with the primary element pointed in one direction. This can be used to ensure that the appropriate upstream and downstream pressure ports are properly coupled to the process variable transmitter. Although not shown in FIGS. 4A-D, typically a seal is placed between the faces of the meter body 112 and the carrier 150 whereby the carrier 150 is secured with the bolts as shown to the meter body 112. However, any attachment technique may be employed.

FIGS. 5A and 5B illustrate a sealing plate 180 mounted to meter body 112. The sealing plate 180 can be mounted using bolts or other connectors and can be sealed to meter body 112 during transportation or initial installation, for example. Additionally, the mounting plate 180 can be used if it is desired to remove a primary element carrier 150 and allow the process to continue to operate.

Figure 6:
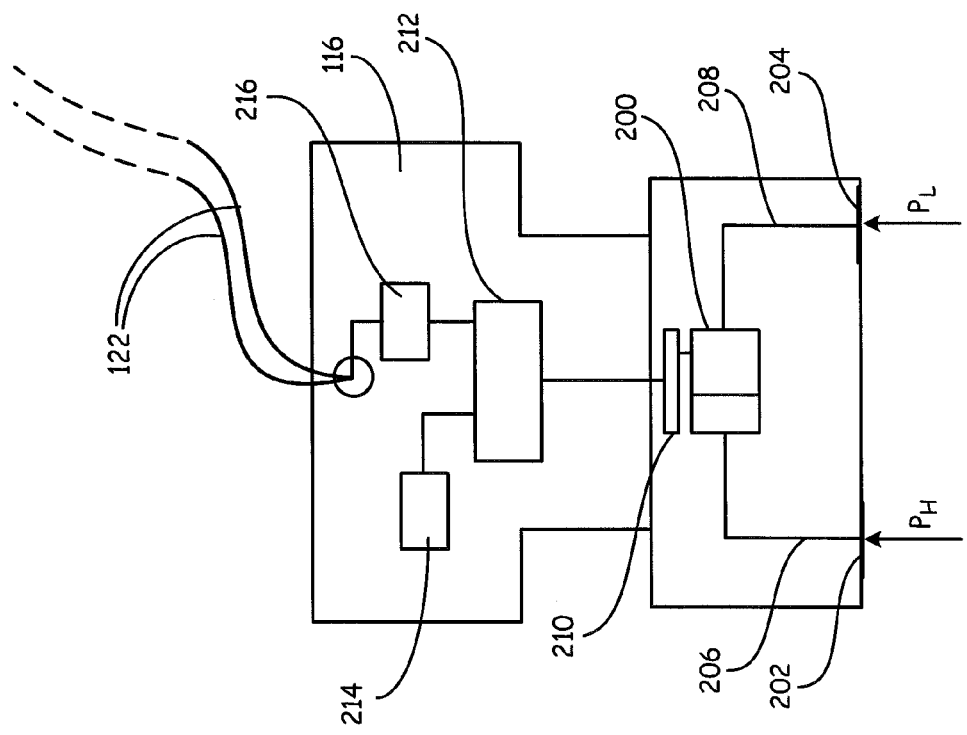
FIG. 6 is a simplified diagram of a pressure transmitter.

FIG. 6 is a simplified diagram of one example configuration of process variable transmitter 116. In FIG. 6, high and low pressures $P_H$ and $P_L$, respectively, are applied to a differential pressure sensor 200. The pressures $P_H$ and $P_L$ can be coupled to differential pressure sensor 200 using an isolating configuration in which isolation diaphragms 202 and 204 separate the process fluid from an isolation fluid carried in capillary tubes 206 and 208, respectively. Based upon the applied differential pressure, the pressure sensor 200 provides a pressure sensor output to sensor circuitry 210. The sensor circuitry 210 can perform compensation or other actions on the sensor signal and provide a signal to measurement circuitry 212. Measurement circuitry 212 can comprise, for example, a microprocessor system operating in accordance with instructions stored in a memory 214. Input/output circuitry 216 couples to measurement circuitry 212 and can be used to provide a transmitter output. For example, this output can be formatted on two-wire process control loop 122. In one configuration, circuitry 216 also receives power from loop 122 and is used to provide power to other circuits within transmitter 116. The present invention is not limited to the particular pressure sensing and measurement techniques discussed herein.

Although the present invention has been described with reference to preferred embodiments, workers skilled in the art will recognize that changes may be made in form and detail without departing from the spirit and scope of the invention. The present invention provides a universal connection platform for measuring flow using differential pressure. Because standardized components and connection arrangements are provided, the memory 214 of the process variable transmitter 116 can contain standardized configuration information for the universal platform. For example, the memory can contain information related to the elongate spool, a particular primary element, as well as other information. This allows installation and set up to be completed more rapidly with less operator interaction, and with a reduced likelihood of error. Further, spare components can be maintained on location whereby damaged components can be easily replaced without needing to obtain specialized or customized replacement parts. The sealing plate 180 illustrated in FIGS. 5A and 5B can be used during transportation of the universal carrier and can also be used to pressure test the components once they are installed in an industrial process. Further, the sealing plate 180 can be used with a spool whereby the spool is used at a process location without the presence of any process variable transmitter. This allows the process to be easily updated at a future date should it be desired to add a process variable sensor at that location. The configuration reduces the amount of customization which must be performed on a process variable transmitter when commissioning a device. Further still, the configuration reduces the amount of customization which must be performed when updating or constructing a plant. This allows much greater flexibility for subsequently modifying the process by obtaining a process variable at a particular location, or changing the technology used to obtain a process variable. Further, this configuration allows different pressure sensing techniques to be easily exchanged even after the device has been installed in a process. For example, if a process is changed whereby a different flow sensing technology may be preferable, an operator can simply replace the installed primary element with a different primary element as desired. The present invention is not limited to differential flow primary elements and may also be used in other configurations. For example, the carrier can carry components for use with any sensing technology, including any flow measurement technology such as vortex, magnetic, coriolis, thermal mass based technologies, etc. In such configurations, a pressure carrying conduit may not be required to extend from the process fluid, through the carrier to the process variable transmitter. Other example primary elements include venturi, wedge, nozzle, small inline primary elements (for a high velocity flow), as well as other technologies including a magnetic flowmeter, a vortex shedding bar, a coriolis based tube, a thermal mass sensor, an ultrasonic based sensor, etc.

Additionally, if the spool conduit has a known shape, appropriate compensation can be performed in the process variable transmitter. One preferred shape is the straight configuration illustrated herein as this provides a more uniformed flow profile through the conduit. As used herein, the "elongate spool" includes spool configurations which are not straight and may include one or more curves, bends, or other configurations.

What is claimed is:

1. An apparatus for measuring flow of a process fluid based upon a differential pressure, comprising:
    an elongate spool providing a spool conduit therethrough adapted to be coupled in line with process piping to receive the flow of process fluid;
    a meter body carried in the elongate spool receiving the spool conduit therethrough, the meter body including a primary element opening which extends from the spool conduit to outside of the meter body;

a carrier including a primary element configured to removably mount to the meter body and position the primary element in the spool conduit through the primary element opening, the carrier including an upstream pressure conduit and a downstream pressure conduit; and a pressure transmitter coupled to the upstream and downstream pressure conduits configured to measure the flow of process fluid based upon a pressure difference between the upstream and downstream pressure conduits.

2. The apparatus of claim 1, wherein the primary element comprises an orifice plate.

3. The apparatus of claim 1, wherein the primary element comprises a pitot tube.

4. The apparatus of claim 1, wherein the primary element opening comprises a slot in the meter body.

5. The apparatus of claim 1, wherein the carrier includes passageways which conduct process fluid from the spool conduit to the pressure transmitter.

6. The apparatus of claim 1, wherein the spool conduit is substantially straight.

7. The apparatus of claim 1, wherein the carrier is configured to fit on the meter body in at most one configuration.

8. The apparatus of claim 1, wherein the spool conduit has first and second ends which include flanges configured to couple to process piping.

9. The apparatus of claim 1, wherein the carrier includes a planar face configured to fluidically couple to a planar face of the pressure transmitter or a flange connection.

10. The apparatus of claim 1, wherein the meter body is further configured to receive a sealing plate.

11. The apparatus of claim 1, wherein the pressure transmitter includes a memory containing configuration information related to the elongate spool.

12. The apparatus of claim 1, wherein the pressure transmitter includes a memory containing configuration information related to the primary element.

13. The apparatus of claim 1, wherein the meter body is configured to receive different types of primary elements.

14. The apparatus of claim 1, wherein the meter body includes a secondary opening configured to receive a process variable sensor.

15. The apparatus of claim 14, wherein the process variable sensor comprises a temperature sensor.

16. A method for measuring flow of a process fluid through process piping based on a differential pressure, the method comprising the steps of:

placing an elongate spool in series with the process piping whereby the process fluid flows through the elongate spool, the elongate spool including a meter body having a primary element opening which extends from a spool conduit to outside of the meter body;

placing a primary element into the spool conduit through the primary element opening, the primary element carried on a carrier;

receiving a first pressure on a first side of the primary element and a second pressure on a second side of the primary element;

conveying the first and second pressures to a differential pressure transmitter; and sensing the first and second pressures and responsively calculating a flow rate of the process fluid.

17. The method of claim 16, wherein the primary element comprises an orifice plate.

18. The method of claim 16, wherein the primary element comprises a pitot tube.

19. The method of claim 16, including providing passageways in the carrier which carry process pressure from the spool conduit to the pressure transmitter.

20. The method of claim 16, wherein the carrier is configured to fit on the meter body in at most one configuration.

21. The method of claim 16, including sealing the primary element opening with a seal in a carrier plug.

22. The method of claim 16, including storing the pressure transmitter in a memory containing configuration information related to the elongate spool.

23. The method of claim 16, including storing the pressure transmitter in a memory containing configuration information related to the primary element.

24. The method of claim 16, wherein the primary element opening is shaped to receive different types of primary elements carried on the carrier.

25. The method of claim 16, including placing a process variable sensor in a secondary opening of the meter body.

* * * * *